United States Patent
Sabapathy et al.

(10) Patent No.: US 8,538,558 B1
(45) Date of Patent: Sep. 17, 2013

(54) SYSTEMS AND METHODS FOR CONTROL WITH A MULTI-CHIP MODULE WITH MULTIPLE DIES

(75) Inventors: Sam Gnana Sabapathy, Sugar Land, TX (US); Alexander Tessarolo, Sydney (AU)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/409,755

(22) Filed: Mar. 1, 2012

(51) Int. Cl.
G05B 9/02 (2006.01)

(52) U.S. Cl.
USPC ........... 700/4; 700/9; 700/21; 700/79; 700/82

(58) Field of Classification Search
None
See application file for complete search history.

(56) References Cited

U.S. PATENT DOCUMENTS

| | | | |
|---|---|---|---|
| 7,253,577 B2 * | 8/2007 | Campbell et al. | 318/563 |
| 2002/0093951 A1 * | 7/2002 | Rupp et al. | 370/362 |
| 2011/0054637 A1 * | 3/2011 | Girardey et al. | 700/9 |
| 2011/0208327 A1 * | 8/2011 | Dickhoff et al. | 700/79 |

* cited by examiner

*Primary Examiner* — Ryan Jarrett
(74) *Attorney, Agent, or Firm* — John R. Pessetto; Wade J. Brady, III; Frederick J. Telecky, Jr.

(57) ABSTRACT

A multi-chip module includes a first die having a control processor to generate a signal to control an industrial process and an input/output interface. The multi-chip module also includes a second die having a supervisory processor and an input/output interface. A processor failure of one of the control processor and the supervisory processor is detected by the other of the control processor and the supervisory processor, and the processor that detects the failure is configured to assert a signal through its input/output interface to cause the industrial process to transition to a safe state in response to the failure. Additionally, the first and second dies are created using different process technologies.

20 Claims, 2 Drawing Sheets

SYSTEMS AND METHODS FOR CONTROL WITH A MULTI-CHIP MODULE WITH MULTIPLE DIES

BACKGROUND

Industrial processes are governed by international standards relating to safety and risk reduction. For example, IEC 61508 addresses functional safety of electrical, electronic, and programmable electronic devices, such as microcontrollers or other computers used to control industrial processes. IEC 61508 defines Safety Integrity Levels (SIL) based on a probabilistic analysis of a particular device. To achieve a given SIL, the device must meet targets for the maximum probability of "dangerous failure" and a minimum "safe failure fraction." The concept of "dangerous failure" is defined on an application-specific basis, but is based on requirement constraints that are verified for their integrity during the development of the industrial system or application. The "safe failure fraction" determines how fail-safe the system is and compares the likelihood of safe failures with the likelihood of dangerous failures. Ultimately, an electronic device's certification to a particular SIL requires that the electronic device provide a certain level of resilience to failures as well as enable the industrial process to transition to a safe state after a failure.

Current electronic devices control aspects of an industrial process (e.g., motors, power conversion devices such as DC/DC converting systems, or energy conversion systems such as solar or wind) via the input/output (I/O) interface of a processor. For example, the processor of a microcontroller receives an indication of position, speed, and/or torque from a motor through its I/O interface. The processor then uses that information to generate, for example, a pulse-width modulated (PWM) signal to control a switch that provides power to the motor and transmits this signal to the switch through the I/O interface. As a result, the motor operates in a manner desired for the particular application.

However, processors and, in particular, their I/O interfaces may experience failures during operation. For example, the processor may be exposed to out-of-tolerance voltages or currents, radiation may cause unacceptable leakage currents in transistors causing a logic element to flip, or the I/O interface itself may fail as a result of its interaction with large external voltages or biases relative to what the processor is subjected to. If the processor or I/O interface fails, then there is no way to ensure that the industrial process being controlled (a motor, in the above example) can be transitioned to a safe state. In other words, fail-safe operation is not guaranteed, which is not acceptable for certain SIL certification.

Certain controllers utilize multiple redundant processors, each with its own I/O interface, to control the industrial process. This increases the likelihood of at least one processor remaining functional in the event that another processor fails, for example due to exposure to an out-of-tolerance voltage or current. Thus, the functional processor with its own I/O interface may cause the industrial process to transition to a safe state. However, controllers with multiple processors require additional components on the board (e.g., sockets and interconnects), which is costly and increases the complexity of board design. Furthermore, failure causes such as external radiation may impact all of the processors similarly and at the same time, which would prevent transitioning the industrial process to a safe state.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
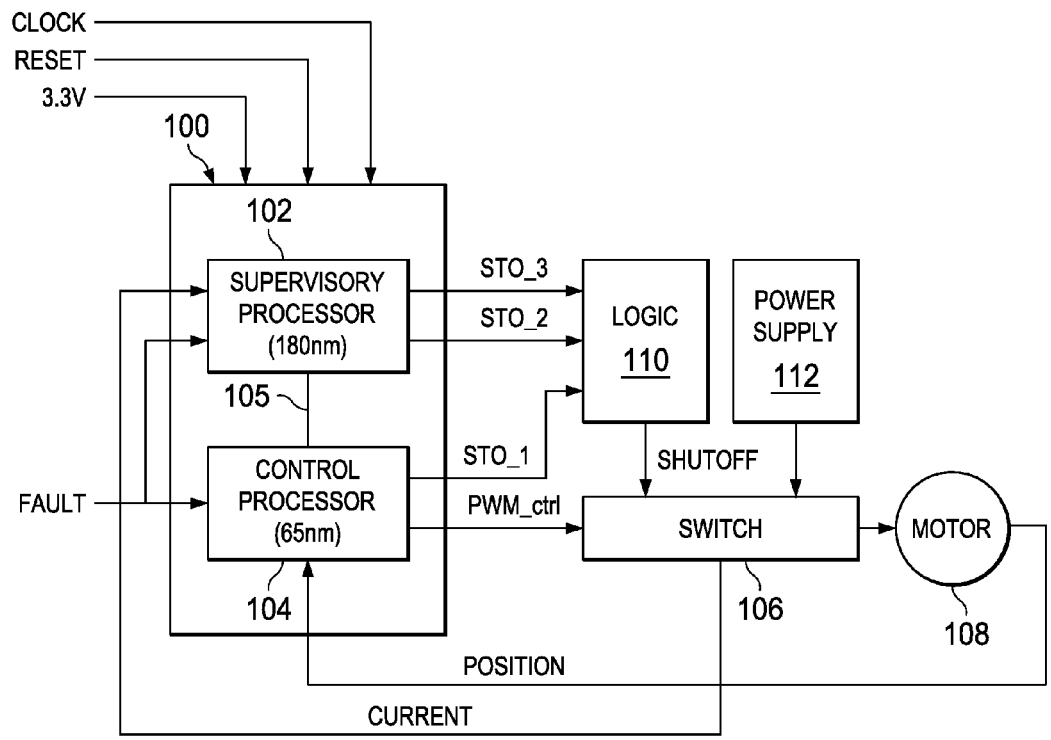
FIG. 1 shows a multi-chip module to control an industrial process in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

As used herein, the term "industrial process" refers to any portion of a procedure to aid in the manufacture, production or synthesis of an item.

As used herein, the term "controller" refers to an electronic device used to control one or more industrial processes.

As used herein, the term "multi-chip module" or "MCM" refers to an electronic package where multiple integrated circuits, semiconductor dies or other discrete components are packaged onto a unifying substrate.

As used herein, the term "process technology" refers to the fabrication or manufacturing method used to create a semiconductor, typically identified as a number of nanometers (nm). As an example, 180 nm, 130 nm, 90 nm, 65 nm, 45 nm, 32 nm, and 22 nm represent various process technologies developed over the past decade or so.

As used herein, the term "assert" refers to setting a signal to its active state. If the signal is active-low, asserting the signal means setting it low. If the signal is active-high, asserting the signal means setting it high.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In accordance with various embodiments, a multi-chip module (MCM) includes at least two dies fabricated using different process technologies. Each die comprises at least one processor having an I/O interface, both of which are independent and separate from the processor and I/O interface on the other die. The processors may communicate with each other via a high-speed interconnect also contained within the MCM. The processors are capable of both detecting a failure of other processors as well as failures external to the MCM. For example, where the MCM is used to control an industrial process such as the operation of a motor, the processors may detect a failure related to the motor, such as over-current situations, external triggers that suggest an overall system failure, operator error, equipment hazard warnings and the like.

Each processor, through its independent I/O interface, may generate signals that control a switch (e.g., through an intervening logic circuit) to cause the motor to transition to a safe state. As used herein, the term "safe state" refers to an application-specific state that is deemed to be ideal for avoiding damage to property, human life and the like. For example, it is likely that the safe state for a motor operating in an industrial process is where the motor is turned off, avoiding uncontrolled operation of the motor. As another example, a valve operating in an industrial process may be open in a safe state if it is desired to enable flow (e.g., release pressure from a vessel) or may be closed in a safe state if it is desired to restrict flow (e.g., maintain a volume in a vessel). In some cases, the safe state of industrial systems may be defined in part by the IEC 61800 specification (relating to adjustable speed electrical power drive systems), the ISO 13849 specification (relating to safety of machinery and safety-related parts of control systems), the IEC 61508 specification, or other similar specifications.

As explained above, each processor is capable of both monitoring the industrial process as well as controlling its operation, at least in so far as being able to generate a signal that causes the industrial process to transition to a safe state. Furthermore, each processor resides on a die fabricated using a different process technology than the other processor. A processor fabricated using one process technology is not as susceptible to a factor (e.g., external radiation or electrical stress) that causes failure of another processor fabricated using a different process technology. Thus, external factors that may lead to all processors failing in other multi-processor controllers are less likely to lead to such a failure in the disclosed embodiments, as they do not necessarily have similar characteristics (e.g., process technology) that would contribute to common cause failures. Furthermore, in accordance with various embodiments, the MCM does not require additional components on the board since it is a single packaged device. These and other features, which will be explained in further detail below, enable a cost-effective controller for industrial processes that is able to be certified to an acceptable SIL rating (e.g., SIL 2, SIL 3, or higher) because of its ability to experience a wide range of failures and still cause the industrial process to transition to a safe state.

Turning now to FIG. 1, a MCM 100 is shown in accordance with various embodiments. The MCM 100 comprises a supervisory processor 102 and a control processor 104, coupled by way of a high-speed interconnect 105. The control processor 104 and supervisory processor 102 may comprise additional components beyond what is shown in FIG. 1. For example, additional connectivity ports may be included, such as a universal asynchronous receiver/transmitter (UART), universal serial bus (USB), and Ethernet as well as various timers, random access memory (RAM), non-volatile memory (e.g., read-only memory (ROM), flash memory), and the like. The MCM 100 is supplied with a clock signal, a reset signal, and a power supply from another component of the controller (not shown). One skilled in the art appreciates that additional external signals may be supplied to the MCM 100 for functionality, and additional components (such as analog/digital (ND) converters) may be employed to process such signals; these are omitted for simplicity. Additionally, while the MCM 100 is part of a controller, certain components, such as logic 110, switch 106, and power supply 112 may be resident to the controller, although this is not required. For this reason, the boundaries of the controller are not shown for simplicity.

In FIG. 1, the supervisory processor 102 is fabricated on a die using a 180 nm process technology and the control processor 104 is fabricated on another die using a 65 nm process technology. As explained above, fabricating the processors using different process technology renders each processor less susceptible to events such as external cosmic radiation exposure that may cause a failure on the other processor. Additionally, using a different process technology for one processor provide better resilience to electrical stress for that processor, where the same electrical stress may cause a failure on the other processor.

The control processor 104 controls the operation of an industrial process, such as a motor 108. One skilled in the art appreciates that, typically, processors themselves are not capable of supplying the high current and voltage that the motor 108 requires for operation. Thus, as shown in FIG. 1, the control processor 104 controls a switch 106 that supplies power from a power supply 112 to the motor 108. The power supply 112 is configured to provide at least the current and voltage necessary for the operation of the motor 108, and the switch 106 is capable of handling such power levels. In some embodiments, the switch 106 may comprise an insulated gate bipolar transistor (IGBT), a metal-oxide-semiconductor field-effect transistor (MOSFET), or other suitable switching device.

The control processor 104 controls the operation of the switch 106, for example, through a pulse-width modulated (PWM) control signal, shown as "PWM_ctrl". In some embodiments, software executing on the control processor 104 generates the PWM control signal to control the speed/torque of the motor 108 based on position feedback received from the motor 108 through the I/O interface of the control processor 104. In some cases, the position feedback from the motor 108 may be a digital signal, or may be an analog signal that is digitized by an ND converter (not shown) and then passed to the control processor 104. During normal operation, the supervisory processor 102 need not control the industrial process. However, in some embodiments, each processor 102, 104 provides redundant control to the industrial process.

As explained above, in some cases, one of the processors 102, 104 or their associated I/O interfaces may experience a failure. These failures may be caused by silicon and/or crystal defects that are exacerbated by external radiation, migration or accumulation of charge carriers, corrosion, degradation in leakage current or pinch-off voltage, electrostatic discharge, or electrical overstress caused by thermal runaway, reverse bias, latchups and the like. Certain levels of SIL certification (e.g., SIL 3) require that in the event of such a failure, the industrial process is transitioned to a safe state. That is, at least one hardware fault can be tolerated safely. As explained above, certain processor failures may be dependent on the process technology of the processor and, as a result, using redundant processors fabricated using the same process technology could cause a common failure to occur across all processors, which is unacceptable for a device seeking to meet certain SIL standards. However, because the supervisory processor 102 and the control processor 104 are fabricated using different process technologies, it is highly unlikely that both processors could fail at the same time. Additionally, as will be explained in further detail below, each processor 102, 104 is capable of both monitoring the motor 108 as well as controlling its operation, at least in so far as being able to generate a signal that causes the motor 108 to transition to a safe state.

In some embodiments, the processors 102, 104 monitor one another for failures via the high-speed interconnect 105. In other embodiments, a failing processor may assert a FAULT signal to the other processor to indicate its failure. Additionally, the processors 102, 104 may receive an indication of an external failure (e.g., a failure associated with the motor 108, switch 106, or power supply 112) through the assertion of the FAULT signal. Each processor 102, 104 receives an asserted FAULT signal at approximately the same time.

In response to an asserted FAULT signal, each capable processor 102, 104 (i.e., the non-failing processor) may assert a safe torque off (STO) or safe stop (SS) signal to a logic block 110. Certain STO signals may be asserted immediately (i.e., in the time it takes the FAULT signal to propagate through any intervening logic circuits) upon receiving an asserted FAULT signal, while others may be asserted "intelligently" in a delayed factor, based on additional safety considerations, for example as defined in IEC 61800 or similar standards. In some cases, software executing on the processors 102, 104 takes the safety considerations into account to determine when to assert the "intelligent" STO signals. For the purposes of FIG. 1, STO_1 and STO_3 are asserted immediately and STO_2 is asserted intelligently. Furthermore, the PWM control signal generated by the control processor 104 may serve as an intelligent signal because the PWM control signal controls the switch 106 and ultimately the motor 108.

The logic 110 asserts a Shutoff signal to the switch 106 that causes the switch 106 to open, or otherwise cease providing power to the motor 108 from the power supply 112. As explained above, each processor 102, 104 may assert an STO signal immediately or "intelligently."

Certain industrial processes may not be safely shut down immediately, for example due to a need to dissipate charge-storing elements and the like. In these cases, the immediately-asserted STO signals from each processor 102, 104 should not control the assertion of a signal from the logic 110 to the switch 106 and the logic 110 may comprise a multi-input AND gate, such that the latest-asserted STO signal controls the shut down of the motor 108. The intelligent STO signal may be driven by software that takes into account various safety considerations and values (such as the Current signal received by the supervisory processor 102 from the switch 106 or the Position signal received by the control processor 104 from the motor 108) to determine an appropriate delay after a failure occurs. In the case where the supervisory processor 102 fails, the intelligent STO signal is actually the PWM control signal driven by the control processor 104, since the logic 110 will not receive asserted STO_2 or STO_3 signals from the failed supervisory processor 102.

However, in other industrial processes, it may be advantageous to shut down as soon as possible. In these cases, the immediately-asserted STO signals from each processor 102, 104 should control the assertion of a signal from the logic 110 to the switch 106 and the logic 110 may comprise a multi-input OR gate, such that the first-asserted STO signal controls the shut down of the motor 108. Here, it is not important which processor 102, 104 fails because the logic 110 will receive (and pass to the switch 106) either an immediately asserted STO_1 signal or STO_3 signal, causing the switch 106 to open. One skilled in the art appreciates that STO signals may alternately be safe stop ("SS") signals, or other signals depending on the nomenclature of the industrial system.

In accordance with various embodiments, the processors 102, 104 each comprise an independent I/O interface and buffer fabricated with different process technologies, which reduces the likelihood that both processors 102, 104 (and their associated I/O interfaces) would fail at the same time due to an event that would typically impact all devices having the same process technology. This enables each processor 102, 104 to monitor and control the industrial process regardless of whether the other processor has failed. Thus, despite a processor failure, the MCM 100 is configured to cause the motor 108 or other industrial process transition to a safe state, enabling the controller to be certified to a higher SIL level. Additionally, because the MCM 100 does not require additional components on the board of the controller, the MCM 100 is a cost-effective solution for achieving the higher SIL level.

Figure 2:
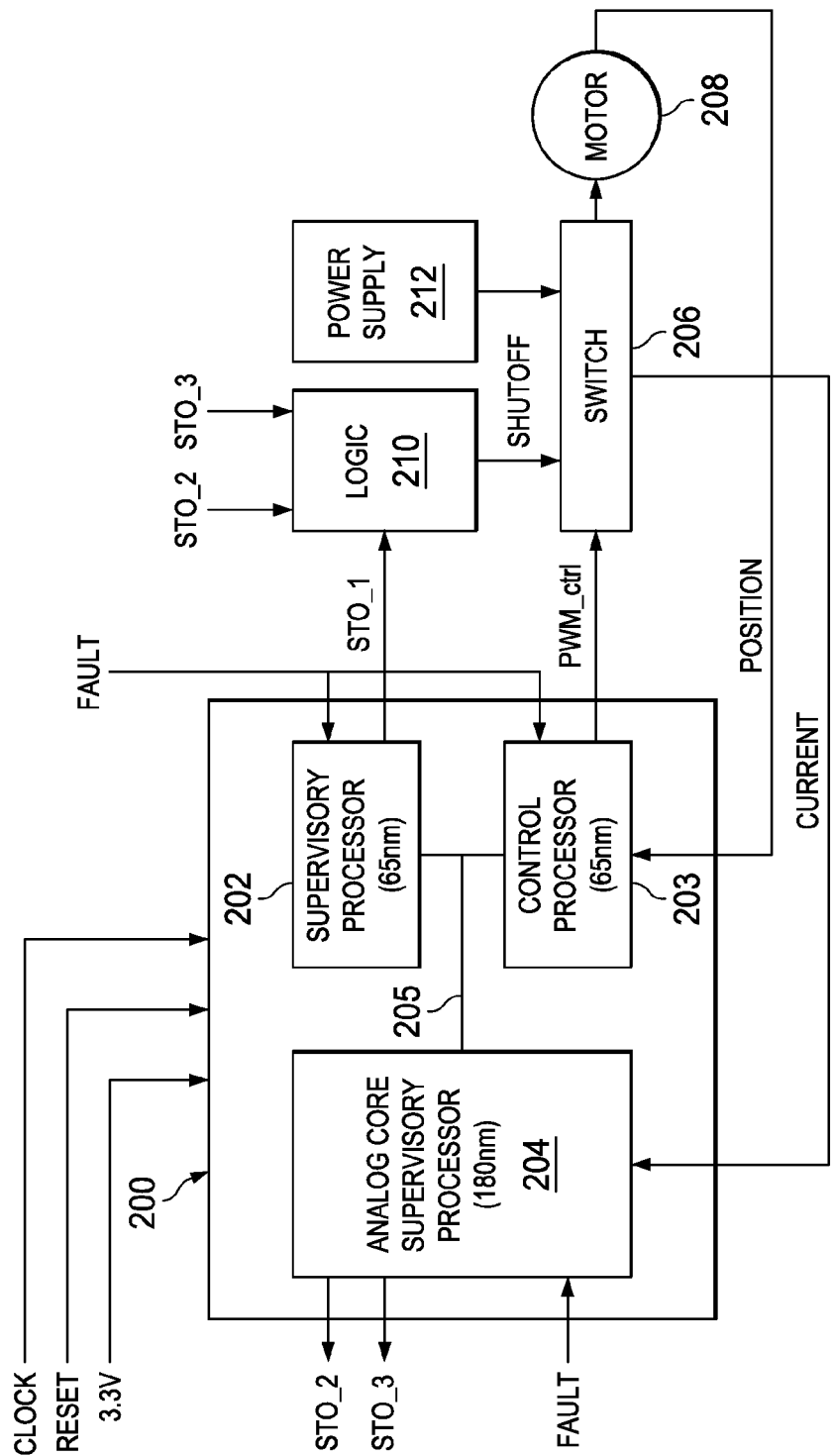
FIG. 2 shows another multi-chip module to control an industrial process in accordance with various embodiments.

Turning now to FIG. 2, an alternate embodiment of an MCM 200 is shown in accordance with various embodiments. A switch 206, logic 210, power supply 212 and motor 208 function similarly to the counterparts of each element shown and described above with respect to FIG. 1. The MCM 200 includes a supervisory processor 202 and a control processor 203, both of which include associated I/O interfaces (not shown) and are fabricated using a 65 nm process technology. Similar to above, the control processor 203 and supervisory processor 202 may comprise additional components beyond what is shown in FIG. 2. For example, additional connectivity ports may be included, such as a universal asynchronous receiver/transmitter (UART), universal serial bus (USB), and Ethernet as well as various timers, random access memory (RAM), non-volatile memory (e.g., read-only memory (ROM), flash memory), and the like. The MCM 200 also comprises an analog core supervisory processor 204 that also includes an associated analog I/O interface (not shown) and is fabricated using a 180 nm process technology. The analog core supervisory processor 204 performs various analog functions, such as ND and D/A conversion, clock management, analog comparisons and voltage regulation. The processors 202, 203, 204 are coupled by way of a high-speed interconnect 205.

Similar to above, in some embodiments, the processors 202, 203, 204 monitor one another for failures via the high-speed interconnect 205. In other embodiments, a failing processor may assert a FAULT signal to the other processor to indicate its failure. Additionally, the processors 202, 203, 204 may receive an indication of an external failure (e.g., a failure associated with the motor 208, switch 206, or power supply 212) through the assertion of the FAULT signal. Each processor 202, 203, 204 receives an asserted FAULT signal at approximately the same time.

In response to an asserted FAULT signal, each processor or combination of processors having the same process technology may assert a STO signal to a logic block 210. Certain STO signals may be asserted immediately (i.e., in the time it takes the FAULT signal to propagate through any intervening logic circuits) upon receiving an asserted FAULT signal, while others may be asserted "intelligently" in a delayed factor, based on additional safety considerations. In some cases, software executing on the processors 202, 203, 204 takes the safety considerations into account to determine when to assert the "intelligent" STO signals. For the purposes of FIG. 2, STO_1 and STO_3 are asserted immediately and STO_2 is asserted intelligently. Furthermore, the PWM control signal generated by the control processor 203 may serve as an intelligent signal because the PWM control signal controls the switch 206 and ultimately the motor 208.

The logic 210 asserts a Shutoff signal to the switch 206 that causes the switch 206 to open, or otherwise cease providing power to the motor 208 from the power supply 212. As explained above, each processor or combination of processors having the same process technology may assert an STO signal immediately or "intelligently," or may assert a signal that functions to intelligently control the motor 208, as is the case with the PWM control signal.

In contrast to FIG. 1, where each processor 102, 104 asserts an immediate STO signal or an intelligent signal to control the motor 108, in FIG. 2, it may be that the 65 nm supervisory processor 202 is configured to assert an immediate STO signal while the 65 nm control processor 203 is configured to assert a signal to control the motor 208. As explained above, processor failures are often caused as a result of an event that affects the processor based on its process technology. Thus, because both the 65 nm technology processors (i.e., 202, 203) and the 180 nm technology processor (i.e., 204) may assert an immediate STO signal or an intelligent signal (e.g., determined by software executing on the processor) to control the motor 208, similar protection is afforded as in FIG. 1.

As above, and in accordance with various embodiments, the processors 202, 203, 204 each comprise an independent I/O interface and buffer fabricated with different process technologies, which reduces the likelihood that the processors 202, 203, 204 (and their associated I/O interfaces) would fail at the same time due to an event that would typically impact all devices having the same process technology. This enables the supervisory and control processors 202, 203 to monitor and control the industrial process regardless of whether the analog core supervisory processor 204 has failed. Likewise, the analog core supervisory processor 204 may monitor and control the industrial process regardless of whether the supervisory and control processors 202, 203 have failed. Thus, despite a processor failure, the MCM 200 is configured to cause the motor 208 or other industrial process transition to a safe state, enabling the controller to be certified to a higher SIL level. Additionally, because the MCM 200 does not require additional components on the board of the controller, the MCM 200 is a cost-effective solution for achieving the higher SIL level.

Figure 3:
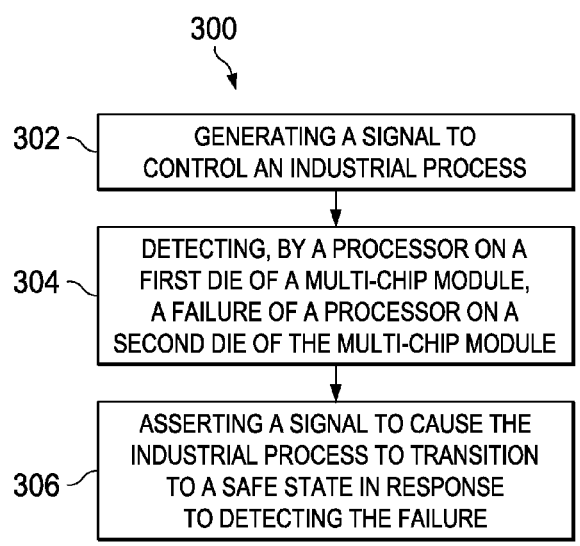
FIG. 3 shows a method flow chart in accordance with various embodiments.

FIG. 3 shows a method 300 in accordance with various embodiments. The method 300 begins in block 302 with generating a signal to control an industrial process. This signal may be, for example, the PWM control signal shown in FIGS. 1 and 2 that is generated by the control processor 104, 203 to operate the switch 106, 206 that controls the flow of power from the power supply 112, 212 to the motor 108, 208. The method 300 continues in block 304 with detecting a failure of another processor. As explained above, a processor on a first die (being fabricated with a first process technology) detects the failure of a processor on a second die (being fabricated with a different process technology than the first process technology). In FIG. 1, this may be the supervisory processor 102 detecting the failure of the control processor 104 or vice versa. In FIG. 2, this may be the analog core supervisory processor 204 detecting the failure of either (or both) of the control processor 203 and the supervisory processor 202 or one (or both) of the control and supervisory processors 202, 203 detecting a failure of the analog core supervisory processor 204. The method 300 continues in block 306 with asserting a signal to cause the industrial process to transition to a safe state in response to detecting the failure and the method ends.

The above discussion is meant to be illustrative of the principles and various embodiments of the present invention. Numerous variations and modifications will become apparent to those skilled in the art once the above disclosure is fully appreciated. For example, although primarily described as employing 65 nm and 180 nm process technologies, the processors of the MCM may be fabricated using any two different process technologies. Additionally, the MCM may employ multiple additional processors beyond those that are shown and described. It is intended that the following claims be interpreted to embrace all such variations and modifications.

What is claimed is:

1. A multi-chip module, comprising:
    a first die comprising:
        a control processor to generate a signal to control an industrial process; and
        an input/output interface;
    a second die comprising:
        a supervisory processor; and
        an input/output interface; and
    wherein a processor failure of one of the control processor and the supervisory processor is detected by the other of the control processor and the supervisory processor, and the processor that detects the failure is configured to assert a signal through its input/output interface to cause the industrial process to transition to a safe state in response to the failure; and
    wherein the first and second dies are created using different process technologies.

2. The multi-chip module of claim 1 wherein the signal to cause the industrial process to transition to a safe state is asserted immediately in response to the detection of a failure.

3. The multi-chip module of claim 1 wherein the signal to cause the industrial process to transition to a safe state is asserted after a delay relative to the detection of a failure.

4. The multi-chip module of claim 3 wherein the supervisory processor detects a failure of the control processor and software executing on the supervisory processor determines an appropriate value for the delay.

5. The multi-chip module of claim 1 wherein the signal to control the industrial process is a pulse-width modulated signal.

6. The multi-chip module of claim 5 wherein the control processor detects a failure of the supervisory processor and alters the pulse-width modulated signal to cause the industrial process to transition to a safe state.

7. The multi-chip module of claim 1 wherein the industrial process comprises a motor.

8. A multi-chip module, comprising:
    a first die comprising:
        a control processor to generate a signal to control an industrial process;
        a supervisory processor; and
        an input/output interface;
    a second die comprising:
        an analog core supervisory processor configured to detect a failure of either the control processor or supervisory processor; and
        an input/output interface; and
    wherein the control processor is configured to detect a processor failure the supervisory processor or the analog core supervisory processor;
    wherein the supervisory processor is configured to detect a processor failure of the control processor or the analog core supervisory processor;
    wherein the processor or processors that detect the failure are configured to assert a signal through their input/output interface to cause the industrial process to transition to a safe state in response to the failure; and
    wherein the first and second dies are created using different process technologies.

9. The multi-chip module of claim 8 wherein the supervisory processor detects a failure of the analog core supervisory processor and immediately asserts the signal to cause the industrial process to transition to a safe state in response to the detection of a failure.

10. The multi-chip module of claim 8 wherein the signal to control the industrial process is a pulse-width modulated signal.

11. The multi-chip module of claim 10 wherein the control processor detects a failure of the analog core supervisory processor and the control processor alters the pulse-width modulated signal to cause the industrial process to transition to a safe state.

12. The multi-chip module of claim 8 wherein the analog core supervisory processor detects a failure of one or more of the control processor and the supervisory processor and immediately asserts the signal to cause the industrial process to transition to a safe state in response to the detection of a failure.

13. The multi-chip module of claim 8 wherein the analog core supervisory processor detects a failure of one or more of the control processor and the supervisory processor and asserts the signal to cause the industrial process to transition to a safe state after a delay relative to the detection of a failure.

14. The multi-chip module of claim 13 wherein software executing on the analog core supervisory processor determines an appropriate value for the delay.

15. The multi-chip module of claim 8 wherein the industrial process comprises a motor.

16. A method for controlling an industrial process, comprising:
   generating a signal to control the industrial process;
   detecting, by a processor on a first die of a multi-chip module, a failure of a processor on a second die of the multi-chip module; and
   asserting, by the processor that detected the failure, a signal to cause the industrial process to transition to a safe state in response to detecting the failure;
   wherein the first and second dies are created using different process technologies.

17. The method of claim 16 further comprising immediately asserting the signal to cause the industrial process to transition to a safe state response to the detection of a failure.

18. The method of claim 16 further comprising asserting the signal to cause the industrial process to transition to a safe state after a delay relative to the detection of a failure.

19. The method of claim 16 wherein the signal to control the industrial process is a pulse-width modulated signal.

20. The method of claim 19 further comprising altering the pulse-width modulated signal to cause the industrial process to transition to a safe state.

* * * * *